United States Patent [19]

Nece

[11] Patent Number: 5,605,642
[45] Date of Patent: Feb. 25, 1997

[54] FLEXIBLE FOOT WARMING DEVICE FOR A SNOWMOBILE

[76] Inventor: Gary L. Nece, 14105 36th Ave. N., Plymouth, Minn. 55447

[21] Appl. No.: 241,156

[22] Filed: Jun. 15, 1994

[51] Int. Cl.$^6$ .................. B60L 1/02; H05B 3/34
[52] U.S. Cl. .......... 219/202; 219/528; 219/536; 219/544; 219/549; 237/77
[58] Field of Search .................. 219/202, 217, 219/528, 535, 536, 543, 544, 548, 549; 237/77

[56] References Cited

U.S. PATENT DOCUMENTS

| 2,762,897 | 9/1956 | Vrooman et al. | 219/202 |
| 2,942,330 | 6/1960 | Luke | 219/528 |
| 3,397,302 | 8/1968 | Hosford | 219/202 |
| 3,644,704 | 2/1972 | Polly, Sr. | 219/202 |
| 3,924,284 | 12/1975 | Nelson | 2/217 |
| 5,072,459 | 12/1991 | Kogler | 2/158 |

OTHER PUBLICATIONS

Shade Tree Catalog, vol. #32, 1994, p. 44.
Minco Products, Inc. Bulletin HS–201, "Thermofoil Heaters", Sep. 1993, pp. 8–11, 23–29.
Manville, "SPM Peel & Stick Sealing Strip", Apr. 1991, pp. 1–2.

*Primary Examiner*—Teresa J. Walberg
*Assistant Examiner*—Raphael Valencia
*Attorney, Agent, or Firm*—Janet Peyton Schafer

[57] ABSTRACT

A foot warmer having a water-proof, flexible rubberized layer to protect the user from electrical shock, for installation on a surface such as a running board of a snowmobile, snow removal, excavation or other motorized outdoor equipment. A foot warmer having a flexible heat element for providing heat when actuated, electrical leads from the motor for providing electrical actuation of the heat element, a rubberized layer on the heating element protecting the heating element from environmental conditions, an aluminum foil layer, positioned on the opposite side of the heat element reflecting heat produced by the heat element toward the first longitudinal side of the heating element, an insulating layer, positioned to abut the aluminum foil layer, for insulating the heat element from environmental conditions and an adhesive layer for attaching the assembled heating element to a surface. A foot warmer having the above elements provided in kit form for use to retro-fit a snowmobile or like equipment for warming user's feet in an outdoor setting.

4 Claims, 3 Drawing Sheets

FLEXIBLE FOOT WARMING DEVICE FOR A SNOWMOBILE

BACKGROUND

This invention relates to a flexible heating element for use with outdoor equipment and specifically to a flexible heating element for providing warmth to feet during outdoor use of snowmobiles and the like.

Numerous outdoor activities take place in winter, ranging from recreational to work related activities. These activities take place even in conditions of inclement weather. Keeping the extremities warm under conditions of cold, wet weather has been a problem. Wearing boots, gloves etc. increases the comfort of persons obliged to be out in inclement weather conditions only to a limited degree. Means have been sought to increase the comfort of persons riding snowmobiles, construction equipment, and the like in winter weather.

Previous foot warming apparatus have had a heating element, directly connected to an electrical circuit, for insertion into the user's boot. A problem with this type of foot warmer is that the user may be endangered if the user comes into direct contact with the electrical circuit through fraying of the electrical leads, or environmental conditions leading to water collecting inside the user's boot.

Another reference teaches a hand warmer having installation of a heating element under a snowmobile handlebar grip. A problem with this art is that there is no similar structure as a grip for the foot of the snowmobile user for application of the heating element thereon.

Another reference teaches use of a thumb warmer that directs electricity directly to a thumb operated lever. A problem with these thumb warmers is that the warmth obtained is minimal. It is felt that more than the user's thumb needs to be warmed. Additionally, there is in this reference no similar structure suggested for use with any part of the user's foot.

It is to these problems that the device of the current invention is directed. A warmer that can be both installed in newly manufactured snowmobiles, snow removal equipment, excavating or construction equipment applications or the like, or retro-fit onto previously manufactured outdoor equipment, the warmer being flexible for attachment to a variety of surfaces, and especially for use in warming the feet. For the foregoing reasons, there is a need for a foot warmer that can be inexpensively made to produce heat to increase the comfort of persons riding unenclosed, off-road motorized equipment in winter weather.

SUMMARY

The present invention is directed to a foot warmer that satisfies these needs by providing a water-proof, flexible foot warmer, having a rubberized layer to protect the user from electrical shock, for installation on a surface such as a running board of a snowmobile, snow removal, excavation or other unenclosed, off-road motorized outdoor equipment or any vehicle not having its own passenger heater. A foot warmer, having features of the present invention includes a flexible heating element, electrical leads, a rubberized outer layer on the heating element, an aluminum foil layer positioned on the side of the heating element away from the rubberized outer layer, an insulating layer positioned to abut the aluminum foil layer and attached to the insulating layer by an adhesive layer, and an additional adhesive layer with a removable paper protective layer, is provided for attaching the assembled foot warmer to a surface. The flexible heating element provides heat when actuated. The electrical leads connect to the battery of the motor of the vehicle providing actuation of the heating element. The rubberized outer layer protects the heating element from environmental conditions. The aluminum foil layer reflects heat produced by the heating element back toward the heating element. The insulating layer is provided for insulating the heating element from environmental conditions.

The present invention is a kit of foot warmers for use with a motorized vehicle such as a snowmobile, snow removal, excavation or other unenclosed, off-road motorized outdoor equipment or any vehicle not having its own passenger heater. The kit comprises a heating element having a protective outer layer, a foil layer and an insulating layer with adhesive layers provided to interconnect these layers. An additional adhesive layer is provided for attaching the foot warmers to a surface. The electrical leads connect the heating element to the battery of the motor for actuation of the heating element and thus producing heat for increasing the comfort of a user of an unenclosed off-road motorized vehicle in winter weather conditions.

An important advantage of this invention is that the user can position the foot warmers anywhere on the motorized equipment where extra warmth would increase the user's comfort. In the case of snowmobiles, placement of the foot warmers is made onto the running board or stirrup of the vehicle.

Another important advantage of this invention is that the user can use the foot warmers even in wet weather or in snow without being in danger of electrical shock.

An additional advantage of this invention is that it can be used with any motorized equipment such as a snowmobile, snow removal, excavation or other unenclosed, off-road motorized outdoor equipment or any vehicle not having its own passenger heater.

BRIEF DESCRIPTION OF THE DRAWINGS

Understanding of the invention will be enhanced by referring to the accompanying drawings, in which like numbers refer to like parts in the several views and in which.

DETAILED DESCRIPTION OF THE PREFERRED EMBODIMENTS

Understanding of the invention will be further enhanced by referring to the following illustrative but nonlimiting example.

Figure 1:
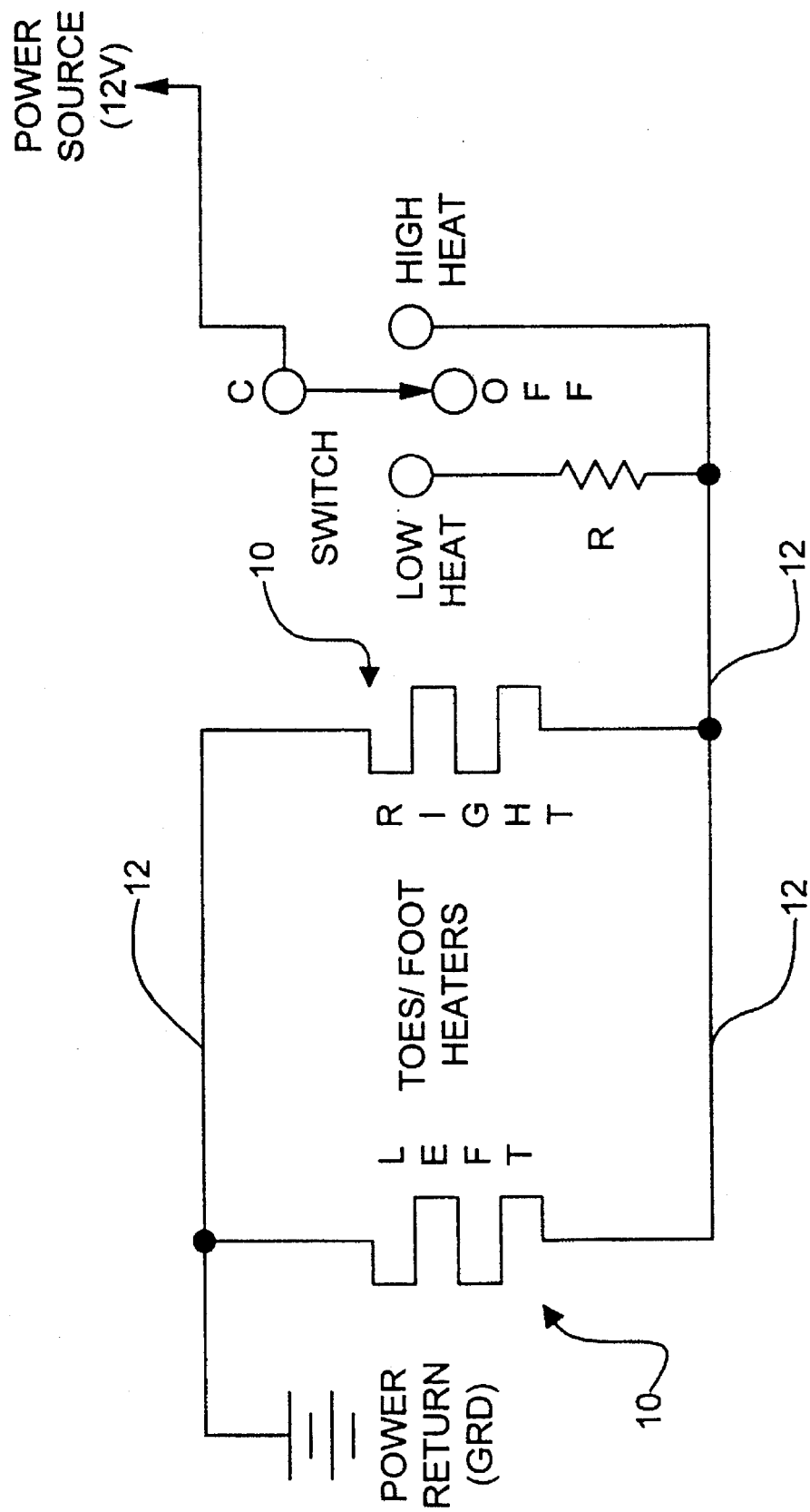
FIG. 1 is a schematic view of the device of this invention in a position of use with the foot warmer positioned both on the right and left side of the motorized equipment.

FIG. 1 illustrates schematically a foot warmer 10 for installation on a motorized vehicle such as a snowmobile, snow removal, excavation or other unenclosed, off-road motorized outdoor equipment or any vehicle not having its own passenger heater, having electrical leads 12 between the vehicle motor, indicated as power source, and foot warmer 10 for providing electricity to actuate foot warmer 10. Foot warmer 10 also has a switch, having at least an on and off position, FIG. 1 illustrating low heat, high heat and off settings as is used in actual use conditions, however, multiple heat settings are envisioned. The switch provides for manual actuation of foot warmer 10.

Figure 2:
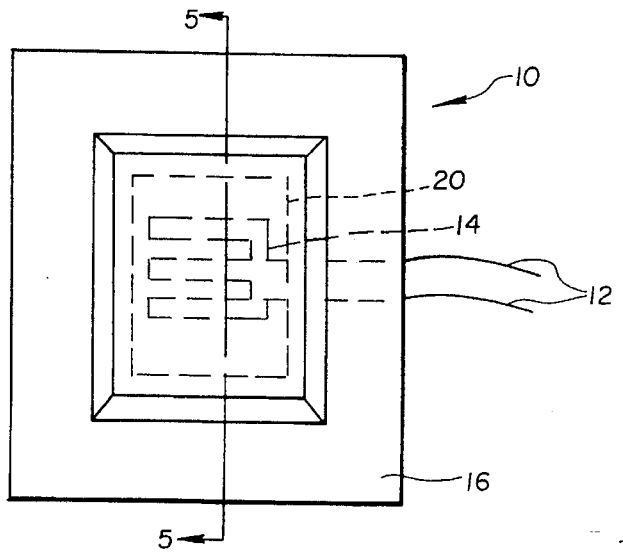
FIG. 2 is a perspective top view of the device of this invention with the heating element shown in phantom.
Figure 3:
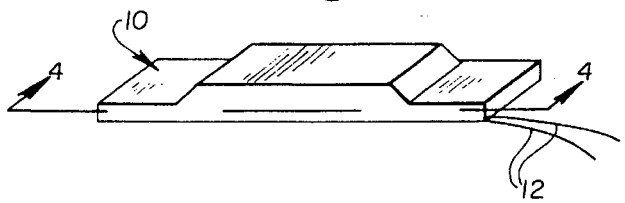
FIG. 3 is a side perspective view of the device of this invention.
Figure 4:
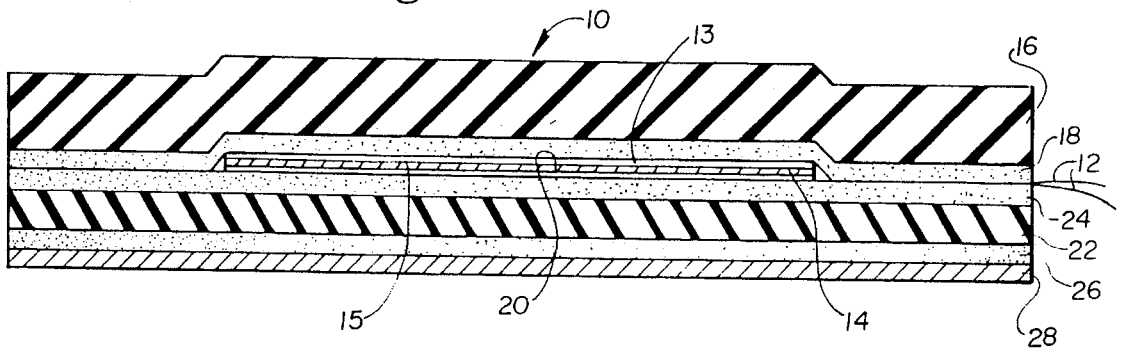
FIG. 4 is a cross sectional view of the device of this invention taken along the lines marked 4—4 on FIG. 3.

Electrical leads 12, shown in detail in FIGS. 2, 3, & 4, connect foot warmers 10, positioned for use on the outdoor vehicle, and completes the electrical connection of the electrical leads by returning to the power source. Resistor R is provided to control the amount of electricity entering the electrical circuit of foot warmer 10. FIG. 1 illustrates schematically the electrical circuit of foot warmer 10 with two foot warmers 10 shown as in actual use conditions. The circuit can be either AC or DC.

FIG. 2 illustrates a foot warmer 10 having a heating element 14, in actual use conditions, a Kapton/FEP or silicone rubber heater sold under that name Thermofoil™, made by MINCO products, Inc., 7300 Commerce Lance, Minneapolis, Minn. 55432-3177, heaters were used although any similar immersible heating element may be used. A moisture protective cover, consisting of a rubberized outer layer 16 is provided to protect heating element 14 from moisture. Rubberized outer layer 16 adheres to a first longitudinal side 13 of heating element 14 by means of adhesive layer 18. Rubberized outer layer 16, in actual use conditions SPM peel and stick sealing strip made by Manneville Corp., P.O. Box 5108, Denver Colo. 80217-5108, although other similar products could be used, is positioned on the side of foot warmer 10 that is in direct contact with the outdoor environment. In actual use conditions, rubberized outer layer 16 is rectangular in shape and functions to keep weather, especially in the form of rain or snow, away from heating element 14.

Aluminum foil layer 20, shown at FIG. 4, is positioned along second longitudinal side 15 of heating element 14. In actual use conditions, aluminum foil layer 20 is square shaped and sized to correspond with the arrangement of heating element 14. A preferred embodiment has heating element 14 arranged in a square configuration as shown in phantom in FIG. 2, although other arrangements of the heating element are envisioned such as rectangular or foot-shaped. Aluminum foil layer 20 can be any size and shape so long as it is at least as large as the heating element 14 configuration. The function of aluminum foil layer 20 is to reflect any heat produced by heating element 14 back toward heating element 14 and rubberized outer layer 16 side of the foot warmer and thus be more beneficial to the user by providing more warmth to the accessible side of the foot warmer 10.

Electrical leads 12 are provided to connect the foot warmer 10 to the vehicle motor, not shown. In FIG. 2, the electrical leads 12 continue into the foot warmer 10, shown in phantom.

FIG. 3 illustrates the foot warmer 10 with the various pressed layers, i.e. pressed together manually and adhered by adhesive layers 18,24,26. Because the heating element and foil layer are positioned only in the center of the foot warmer, that area is thicker than at any edge of the foot warmer.

Figure 5:
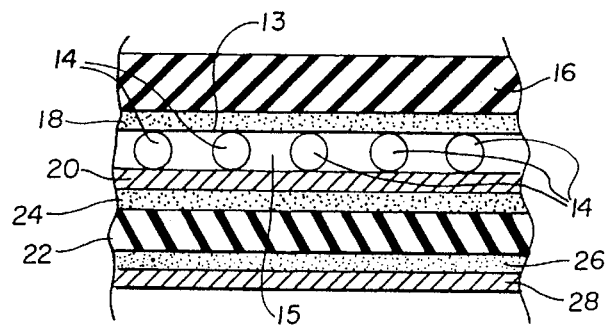
FIG. 5 is a cross-sectional view of a segment of the device of the this invention taken along the lines marked 5—5 on FIG. 2.

FIG. 4 illustrates in detail the various layers that make up the foot warmer 10. Rubberized outer layer 16 is shown on top of heating element 14 and connected thereto by adhesive layer 18. Immediately below heating element 14 is positioned aluminum foil layer 20. Aluminum foil layer 20 is positioned for use on insulating layer 22 and adhered to insulating layer 22 by adhesive layer 24. Because aluminum foil layer 20 is smaller than the surrounding layers, namely, rubberized outer layer 16 and insulating layer 22, adhesive layers 18 & 24 position and hold fast aluminum foil layer 20. Insulating layer 22 is illustrated also at FIG. 5. In actual use conditions a double adhesive backed foam layer has been used although other thermal insulating materials could be used. The function of insulating layer 22 is to insulate heating element 14 from the cold surface of the snowmobile. Snowmobiles and other outdoor equipment are generally constructed of metal or plastic and therefore conduct heat readily. The cold surface of the snowmobile where foot warmer 10 is positioned, would conduct heat away from heating element 14 without insulating layer 22. If this occurred, additional heat energy would be required to produce enough heat to overcome this heat conduction before heat would be perceptible to the user.

Figure 6:
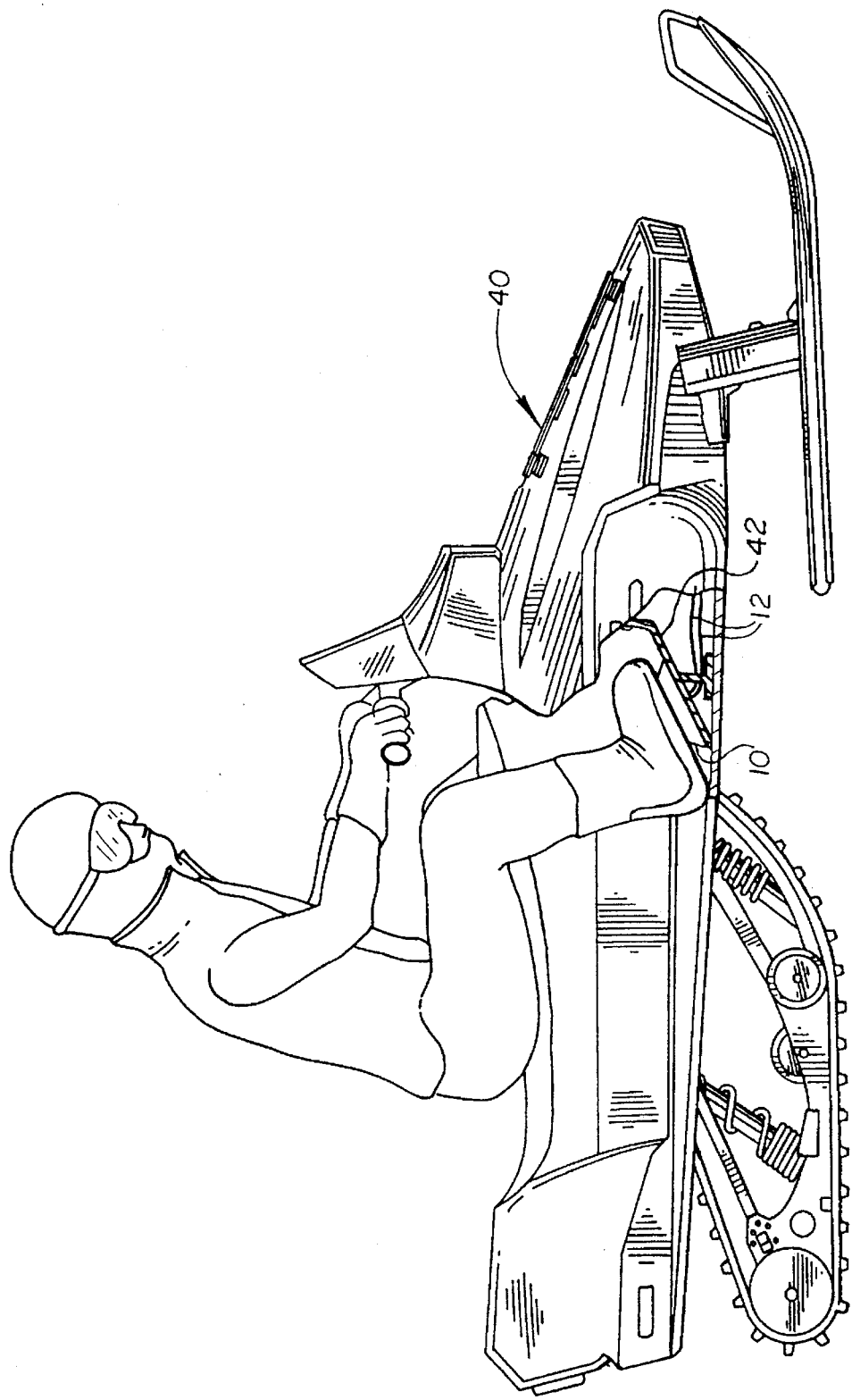
FIG. 6 is a side perspective view of the device of this invention shown in its place of use.

In use, the assembled foot warmer 10 is attached to the snowmobile 40, or other equipment, by means of adhesive layer 26. Protective paper 28 covers adhesive layer 26, removal of the protective paper 28 exposes adhesive layer 26 and adheres foot warmer 10 in the selected position of use. Adhesive layer 26 allows the user to position the foot warmer in any position on any surface. In actual use conditions, the user positions foot warmer 10 on the running board or stirrup 42 of the snowmobile 40 or other outdoor motorized equipment, shown at FIG. 6.

In actual use conditions, foot warmer 10 is manufactured by providing double backed foam insulation, having protective paper 28 layer and adhesive layers 24,26 along both longitudinal sides, cut to the desired size. Aluminum foil layer 20, sized and configured to correspond to the size and configuration of selected heating element 14, is placed upon the center of the foam insulating layer 22 and adhered thereto by adhesive layer 24, shown here with protective paper 28 layer removed. Heating element 14 is selected from a group of such heating elements having different heat capacities dependent on the amount of watts going therethrough. In actual use conditions, a heating element having a wattage between 15 and 20 watts has been found to be most useful, however, other higher or lower wattage amounts could be used depending on the amount of heat required. Heating element 14 is centered on aluminum foil layer 20. Rubberized outer layer 16, having an adhesive layer 18, is cut to correspond with the size and configuration of the foam insulation layer 22. The several pressed layers, pressed together by various known means including manually pressing the layers together, seal the several layers for the purpose of keeping moisture out and to form an assembled foot warmer unit 10. This assembled foot warmer 10 can be sold as a unit in kit form having two foot warmers per kit.

The user cleans the selected area with a solvent cleaner, positions foot warmer 10 in a desired location and removes protective paper layer 28 exposing adhesive layer 26. Electrical leads 12 are positioned toward the vehicle motor side of the foot rest and are then routed to the motor. Actuation of the motor followed by manually moving toggle switch to "on", "hi" or "low", by means of an on-off toggle switch on the snowmobile or other motorized vehicle provides electrical energy from the battery or the motor of the motorized vehicle, as desired. The preferred embodiment utilizes an electrical circuit that is actuated only when the motor of the motorized vehicle is actuated.

Actuation of foot warmer 10 provides heat to the operator's feet when the operator's feet are in juxtaposition with foot warmers 10. The completed electrical circuit is illustrated at FIG. 1.

Although the present invention has been described in considerable detail with reference to certain preferred versions thereof, other versions are possible, i.e. hand warmers. Additionally, if more than one person rides the motorized equipment, more than one set of foot warmers could be used. Therefore, the spirit and scope of the appended claims should not be limited to the description of the preferred versions contained herein.

What is claimed is:

1. A warming device which attaches to a surface of a snowmobile, comprising:
   a) a generally planar flexible electrical heating element, which provides heat when electrically actuated, said element consisting of a single etched-foil electrically resistive layer, said single layer laminated between two layers of flexible electrical insulation;
   b) electrical connectors which provide electrical connection of the heating element to a battery of the snowmobile;
   c) a moisture impervious layer mounted along an exterior surface of one of the flexible electrical insulation layers of the heating element, which moisture impervious layer protects the electrically resistive element and the flexible electrical insulation layers of the heating element from moisture;
   d) a heat reflecting layer, positioned along an exterior surface of the second flexible electrical insulation layer of the heating element, which heat reflecting layer reflects heat produced by the heat element toward the first surface;
   e) a thermal insulating layer, positioned to abut the heat reflecting layer, which thermally insulates the heating element; and
   f) an adhesive layer which attaches the warming device to a surface of the snowmobile.

2. The device of claim 1, wherein the moisture impervious layer which protects the heating element from moisture further comprises a rubberized layer.

3. The device of claim 1, wherein the thermal insulating layer further comprises a neoprene foam rubber layer.

4. The device of claim 1, wherein the warming device is a foot warming device.

* * * * *